May 21, 1968  M. S. HATHAWAY ETAL  3,384,114
MANIFOLD FOR MOUNTING VALVES RADIALLY
Filed Sept. 9, 1965  2 Sheets-Sheet 1

INVENTORS
MILTON S. HATHAWAY
JOHN H. WERNER
BY Isler & Ornstein
ATTORNEYS

| United States Patent Office | 3,384,114
Patented May 21, 1968 |
|---|---|

3,384,114
MANIFOLD FOR MOUNTING VALVES
RADIALLY
Milton S. Hathaway, 586 Carlin Road, Northfield, Ohio
44067, and John H. Werner, 18000 North Blvd., Maple
Heights, Ohio 44137
Filed Sept. 9, 1965, Ser. No. 486,174
5 Claims. (Cl. 137—608)

ABSTRACT OF THE DISCLOSURE

A manifold is provided having axial fluid bores, sides for mounting valves radially, and passageways extending from the bores to said valves, and from the valve to controlled devices remote from the manifold.

This invention relates, as indicated, to a manifold for mounting valves radially.

A primary object of the invention is to provide a manifold of the character described which is of an extremely compact nature, and which permits a greater number of valves to be mounted therein in a given space than has heretofore been possible.

Another object of the invention is to provide a manifold of the character described which is of relatively light weight and simple construction, and which is adapted to be made from a variety of materials, including metal, plastic and rubber.

A further object of the invention is to provide a manifold of the character described which greatly reduces the amount of piping required in a hydraulic or pneumatic control system, which has greater versatility than other types of manifold, permitting different pressures to be utilized in the system, and which permits a greater number of components to be installed in the hydraulic circuits.

Other objects and advantages of our invention will be apparent during the course of the following description.

In the accompanying drawings forming a part of this specification, and in which like numerals are employed to designate like parts throughout the same, FIG. 1 is a view illustrating, in a more or less diagrammatic manner, a hydraulic control system utilizing the manifold of the present invention, and showing also a function of the control system;

Figure 1:
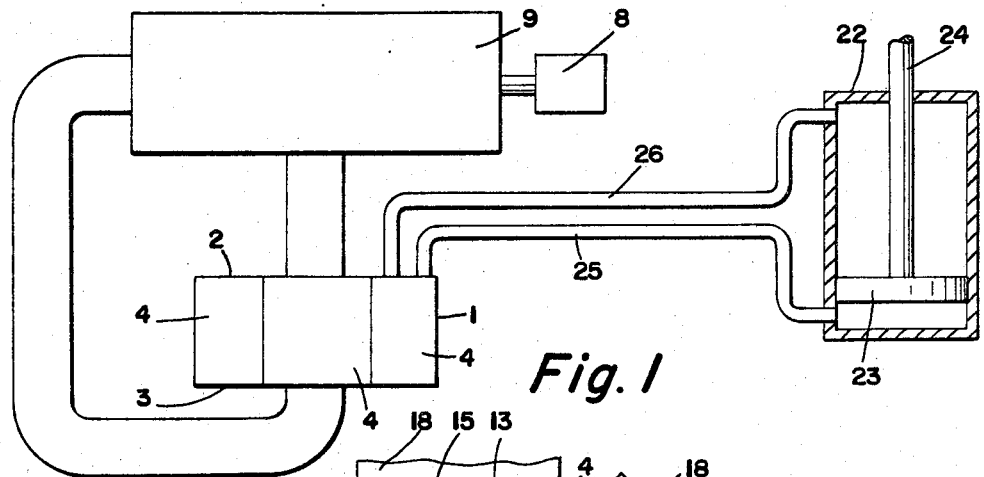
Figure 2:
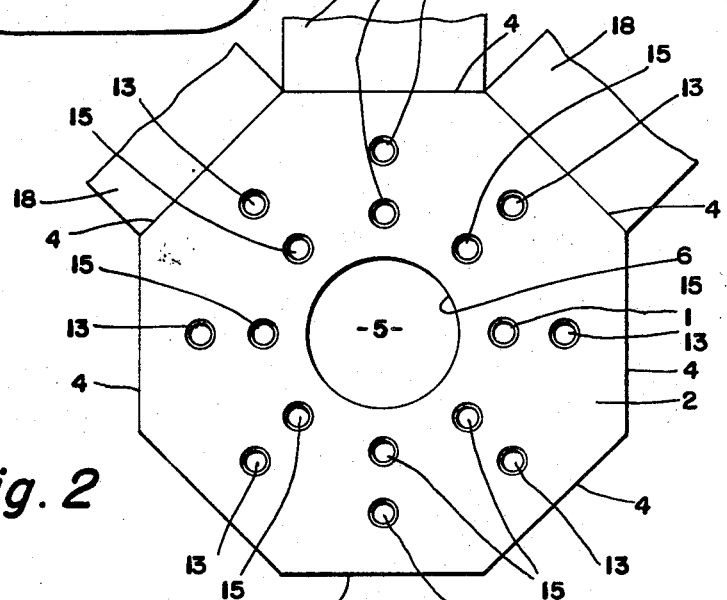
FIG. 2 is a top plan view of the manifold, and showing also the manner in which valves are mounted on the manifold.
Figure 3:
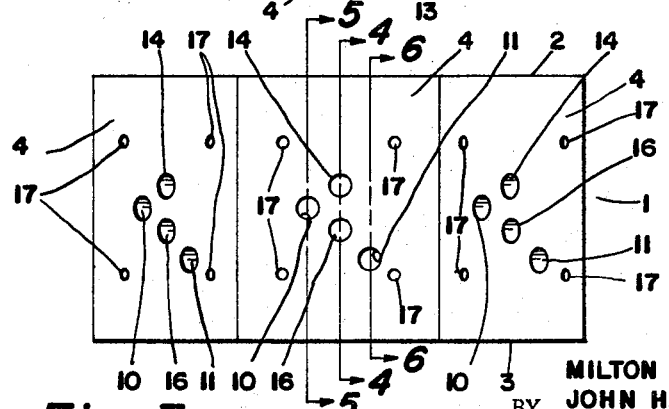
FIG. 3 is a front elevational view of the manifold shown in FIG. 2.
Figures 4, 5, 6:
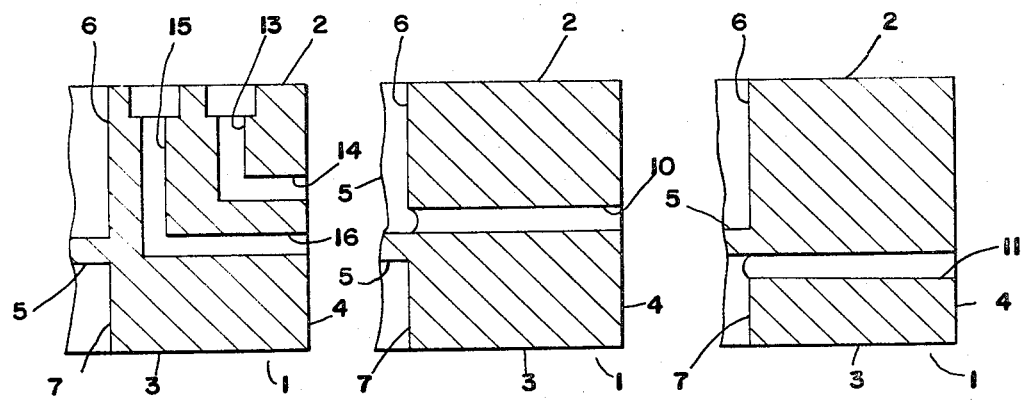
FIG. 4 is a fragmentary cross-sectional view, taken on the line 4—4 of FIG. 3.
FIG. 5 is a fragmentary cross-sectional view, taken on the line 5—5 of FIG. 3.
FIG. 6 is a fragmentary cross-sectional view, taken on the line 6—6 of FIG. 3.

Referring more particularly to the drawings, the manifold will be seen to comprise a solid member, designated generally by reference numeral 1, and having an upper face 2, a lower or bottom face 3, and sides 4, there being eight such sides employed in the embodiment shown, forming an octagon.

The manifold is provided with a central vertical bore or passageway, which is divided by a transverse web or partition 5, into a pressure port 6 and a return port 7.

It may be noted, at this point, that each of the sides 4 of the manifold is disposed or lies in a plane substantially perpendicular to a radial line extending from the axis of the bore forming the ports 6 and 7, to the center of the sides 4.

Fluid, under constant pressure, furnished by a pump 8, is supplied from a tank 9 to the pressure port 6, and this fluid is returned to the return port 7, and thence to the tank 9.

Extending perpendicularly from each of the sides 4 of the manifold to the bottom of the pressure port 6 are passageways or bores 10, and extending perpendicularly from each of the sides 4 of the manifold to the top of the return port 7, in spaced parallel relation to the passageways 10, are passageways or bores 11.

Each segment of the manifold is also provided with a vertical bore or passageway 13, which extends downwardly from the upper face 2 of the manifold and communicates with the inner end of a passageway 14 extending radially through the manifold to the side 4 of the segment.

Each segment of the manifold is further provided with a vertical bore or passageway 15, which extends downwardly from the upper face 2 of the manifold and communicates with the inner end of a passageway 16 extending radially through the manifold to the side 4 of the segment.

Secured to each of the sides 4 of the manifold 1, as by bolts (not shown) which are secured in threaded apertures 17 of the manifold, is a solenoid-operated directional valve of the spring offset, four-way type, such valves being designated generally by reference numeral 18.

Figure 7:
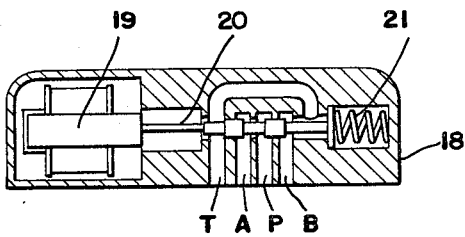
FIG. 7 is a cross-sectional view of a conventional solenoid operated, spring offset, directional valve of the four-way type, showing the position of the parts thereof, when the solenoid is de-energized.
Figure 8:
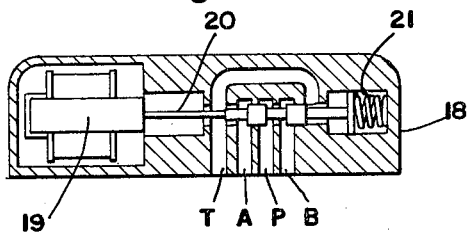
FIG. 8 is a view similar to FIG. 7, but showing the position of the parts when the solenoid is energized.

The interior of the valve 18 is shown more or less diagammatically in FIGS. 7 and 8, and shows the valve to consist of a solenoid 19, a valve spool 20, and a compression coil spring 21.

The valve 18 is provided with passageways or ports, which, for purposes of clarity, are designated by the letters T, A, P and B.

When the solenoid 19 is de-energized, the spring 21 maintains the spool 20 in the position shown in FIG. 7, and when the solenoid 19 is energized, the spool 20 is shifted to the position shown in FIG. 8.

In the position shown in FIG. 7, the port P communicates with or is connected with port A, and the port B communicates with or is connected with port T.

In the position shown in FIG. 8, the port P communicates with or is connected with port B, and the port A communicates with or is connected with port T.

During shifting of the spool 20 from one position to the other, all of the ports T, A, P and B are momentarily blocked, one from another.

In mounting each of the valves 18 on the manifold, the port P is brought into registration with the outer end of the bore 10 of the manifold, the port T is brought into registration with the outer end of the bore 11, the port A is brought into registration with the outer end of the passageway 14, and the port B is brought into registration with the outer end of the passageway 16.

Although the ports T, A, P and B, are shown in FIGS. 7 and 8, as in parallel alignment with each other, it will be understood that in the actual valves which are mounted on the manifold, portions of these ports will necessarily be offset to permit alignment or registration with the bores 10 and 11, and passageways 14 and 16 of the manifold.

In FIG. 1, there is illustrated, in a more or less diagrammatic manner, one function of the manifold and valve. In this figure, a cylinder 22 is shown, in which a piston or plunger 23 is disposed for slidable reciprocal movement, this piston having a rod 24 which extends through one end of the cylinder, and which may be connected to an operative part of a machine or the like.

A conduit 25 extends from the upper end of the bore 13 of the manifold to the cylinder 22, at one side of the piston or plunger 23, and a conduit 26 extends from the upper end of the bore 15 of the manifold to the cylinder 22, at the other side of the piston or plunger 23.

Assuming that the spool 20 of the valve 19 is in the position shown in FIG. 7, a fluid, under pressure, passes from the tank 9 to the pressure port 6, thence through passageway 10 of the manifold to port P of the valve 19, port A, passageway 14, passageway 13, conduit 25 and to one side of the piston 23, forcing the piston toward the opposite end of the cylinder 22.

At the same time, fluid at the other side of the piston 23 is forced out of the cylinder through conduit 26, through passageway 15, passageway 16, port B of the valve 19, port T, passageway 11 of the manifold, return port 7, and back to the tank 9.

Assuming that the spool 20 of the valve 19 is in the position shown in FIG. 8, the fluid, under pressure passes from the tank 9 to the pressure port 6, thence through passageway 10 of the manifold to port P of the valve 19, port B, passageway 16, passageway 15, conduit 26 and to the other side of the piston 23, forcing the piston toward the opposite end of the cylinder 22.

At the same time, fluid at the opposite side of the piston 23 is forced out of the cylinder through conduit 25, through passageway 13, passageway 14, port A of the valve 19, part T, passageway 11 of the manifold, return port 7, and back to the tank 9.

It is thus seen that we have provided an manifold for mounting valves in a novel radial manner, which is of an extremely compact nature, permitting a greater number of valves to be mounted thereon in a given space than has heretofore been possible, which is of relatively light weight and simple construction, adapting it to be made of a variety of materials, such as metal, plastic, rubber and the like, which is of such a character as to greatly reduce the amount of piping required in a hydraulic control system, and which was greater versatility than other types of manifolds, permitting different pressures to be utilized in the system, as well as a greater number of components to be installed in the hydraulic circuit.

Although the invention has been described with reference to its use in a hydraulic control system, it will be readily understood that the invention is also adapted for use in a pneumatic control system.

Moreover, although a specific embodiment of the invention has been illustrated and described, which permits the mounting of eight valves on the manifold, the manifold may be provided with any number of sides, from 4 to 10 inclusive, with no changes in the arrangement of bores or passageways, except in the total number of bores or passageways. Thus, if the manifold is of cubical form, and has four sides, four valves will be used, one connected radially to each side, but with no change in the number and arrangement of the bores or passageways in each segment of the manifold. In each case, however, the sides will be disposed in or lie in planes substantially perpendicular to a radial line extending from the axis of the bore forming the ports 6 and 7, to the center of the sides.

It is to be understood that the form of our invention, herewith shown and described, is to be taken as a preferred example of the same, and that various changes may be made in the shape, size and arrangement of parts thereof, without departing from the spirit or the invention or the scope of the subjoined claims.

Having thus described our invention, we claim:

1. A manifold of the character desecribed, comprising a solid member having a top face of polygonal contour having in excess of four side edges, and a bottom face of like contour in spaced parallel relation with the top face, rectangular sides extending from each of the side edges of the top face to the corresponding edges of the bottom face, a bore extending axially into said manifold from said top face, a second bore extending axially into said manifold from the bottom face, a web separating said bores, a first passageway extending from said first bore to each rectangular side, and a second passageway extending from said second bore to each rectangular side, said passageways being parallel with each other.

2. A manifold, as defined in claim 1, including a third passageway extending through said manifold from said top face to each side, and a fourth passageway extending from said top face to each side.

3. In combination, a manifold having a central axial bore for flow of a medium under pressure, said manifold having a plurality of sides disposed in planes substantially perpendicular to lines extending radially from the axis of said central bore to the centers of said sides and disposed equidistantly from said axis, and control valves mounted on said sides and extending outwardly from said sides, said manifold having passageways extending from said central bore to said valves for passage of said medium under pressure for actuation of said valves, said manifold having additional passageways for passage of said medium under pressure to and from said valves for control of devices remote from said manifold.

4. A manifold of the character described, comprising a member having top and bottom faces, a bore extending axially into said member from said top face, a second axial bore extending centrally into said member from said bottom face and in axial alignment with said first bore, said first and second bores being separated from each other by a web extending transversely of said bores, said manifold having a plurality of sides which are similar in contour with each other, each of said sides being disposed in a plane which is substantially perpendicular to a line extending radially from the axis of said bores to the center of the side, said manifold including a first passageway extending from said first bore to each of said sides, a second passageway extending from said second bore to each of said sides, a third passageway extending from said top face to each side, and a fourth passageway extending from said top face to each side.

5. A manifold of the character described, comprising a solid member having a top face of regular polygonal contour having in excess of four sides, and a bottom face of like contour as the top face in spaced parallel relation with the top face, rectangular side faces extending vertically from each of the sides to the corresponding sides of the bottom face, a cylindrical bore extending axially into said manifold from said top face, a second cylindrical bore of substantially the same diameter as the first bore extending axially into said manifold from the bottom face and in axial alignment with the first bore, a web separating said bores, a first pasageway extending from said first bore to each of said rectangular side faces, a second passageway extending from said second bore to each of said rectangular side faces, said second passageway being parallel with said first passageway, a third passageway extending through said manifold from said top face to each of said rectangular side faces, and a fourth passageway extending from said top face to each of said rectangular side faces.

References Cited

UNITED STATES PATENTS

| 481,943 | 9/1892 | Gustin | 137—608 |
|---|---|---|---|
| 2,366,693 | 1/1945 | Benaway | 137—596 |
| 2,475,298 | 7/1949 | Sloane | 137—596 |
| 2,552,848 | 5/1951 | Gabriel et al. | 137—608 X |
| 2,845,939 | 8/1958 | Bayer | 137—609 X |
| 2,997,068 | 8/1961 | Roos | 137—608 X |
| 3,011,509 | 12/1961 | Wilson | 137—609 X |
| 3,195,572 | 7/1965 | Carls | 137—608 |
| 3,244,193 | 4/1966 | Loveless | 137—608 X |

M. CARY NELSON, *Primary Examiner.*

S. SCOTT, *Assistant Examiner.*